United States Patent
Wang et al.

(10) Patent No.: US 9,848,168 B2
(45) Date of Patent: Dec. 19, 2017

(54) METHOD, SYNTHESIZING DEVICE, AND SYSTEM FOR IMPLEMENTING VIDEO CONFERENCE

(71) Applicant: Huawei Technologies Co., Ltd., Shenzhen (CN)

(72) Inventors: Tian Wang, Beijing (CN); Yanling Guo, Shenzhen (CN); Bo Liu, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/262,596

(22) Filed: Sep. 12, 2016

(65) Prior Publication Data
US 2016/0381322 A1 Dec. 29, 2016

Related U.S. Application Data (63) Continuation of application No. PCT/CN2015/073689, filed on Mar. 5, 2015.

(30) Foreign Application Priority Data

Mar. 19, 2014 (CN) .......................... 2014 1 0103018

(51) Int. Cl.
H04N 7/14 (2006.01)
H04N 7/15 (2006.01)
H04N 5/04 (2006.01)

(52) U.S. Cl.
CPC ................. *H04N 7/15* (2013.01); *H04N 5/04* (2013.01); *H04N 7/142* (2013.01)

(58) Field of Classification Search
None
See application file for complete search history.

(56) References Cited

U.S. PATENT DOCUMENTS 6,577,333 B2 * 6/2003 Tai .......................... H04N 5/268
                                                                                          348/14.01
8,502,857 B2      8/2013 Halavy
(Continued)

FOREIGN PATENT DOCUMENTS

CN           1981516 A     6/2007
CN        101022352 A     8/2007
(Continued)

OTHER PUBLICATIONS

Machine Translation and Abstract of Chinese Publication No. CN102724479, Oct. 10, 2012, 15 pages.
(Continued)

*Primary Examiner* — Quoc D Tran
(74) *Attorney, Agent, or Firm* — Conley Rose, P.C.

(57) ABSTRACT

A method, device, and system for implementing a video conference includes obtaining in real time an image of a first scene from a main camera located in a first conference site, obtaining in real time an image of a second scene from an auxiliary camera located in the first conference site, the second scene is a part of the first scene, and the second scene includes a target object, generating a target image in real time according to the image of the first scene and the image of the second scene and based on a location of the target object in the first conference site, a location of the image of the second scene in the target image is corresponding to the location of the target object in the first conference site, and sending the target image in real time to a display device located in a second conference site.

20 Claims, 5 Drawing Sheets

(56) References Cited

U.S. PATENT DOCUMENTS

| | | | | |
|---|---|---|---|---|
| 2005/0007453 | A1* | 1/2005 | Ahiska | H04N 7/183 348/143 |
| 2010/0002070 | A1* | 1/2010 | Ahiska | G08B 13/19691 348/36 |
| 2011/0254914 | A1* | 10/2011 | Ng | H04N 21/42202 348/14.16 |
| 2012/0154510 | A1* | 6/2012 | Huitema | H04N 5/23222 348/14.03 |
| 2014/0063176 | A1* | 3/2014 | Modai | H04N 5/23219 348/14.05 |
| 2015/0244976 | A1* | 8/2015 | Chen | H04N 7/141 348/14.07 |

FOREIGN PATENT DOCUMENTS

| | | |
|---|---|---|
| CN | 101616260 A | 12/2009 |
| CN | 101860715 A | 10/2010 |
| CN | 102724479 A | 10/2012 |
| CN | 102754434 A | 10/2012 |
| TW | 201410015 A | 3/2014 |
| WO | 2011140812 A1 | 11/2011 |

OTHER PUBLICATIONS

Foreign Communication From a Counterpart Application, PCT Application No. PCT/CN2015/073689, English Translation of International Search Report dated May 29, 2015, 2 pages.

Foreign Communication From a Counterpart Application, PCT Application No. PCT/CN2015/073689, English Translation of Written Opinion dated May 29, 2015, 5 pages.

Machine Translation and Abstract of International Publication No. WO2011140812, Nov. 17, 2011, 6 pages.

Foreign Communication From a Counterpart Application, Chinese Application No. 201410103018.4, Chinese Search Report dated Jun. 18, 2017, 2 pages.

Foreign Communication From a Counterpart Application, Chinese Application No. 201410103018.4, Chinese Office Action dated Jun. 27, 2017, 4 pages.

* cited by examiner

METHOD, SYNTHESIZING DEVICE, AND SYSTEM FOR IMPLEMENTING VIDEO CONFERENCE

CROSS-REFERENCE TO RELATED APPLICATIONS

This application is a continuation of International Application No. PCT/CN2015/073689, filed on Mar. 5, 2015, which claims priority to Chinese Patent Application No. 201410103018.4, filed on Mar. 19, 2014, both of which are hereby incorporated by reference in their entireties.

TECHNICAL FIELD

Embodiments of the present disclosure relate to the communications field, and in particular, to a method, synthesizing device, and system for implementing a video conference.

BACKGROUND

With a sharp acceleration of population mobility, more people urgently require communication and collaboration at different places. Emergence of a video conference technology well meets this need of human beings. There are numerous types of video conferencing systems, which may be roughly classified into two categories according to an interaction manner: 1. a conference system in which one party acts as a speaker, such as a remote education system, a television and broadcast conference system, and a remote launch event system; 2. a conference system in which two or more participants equally interact with each other in the conference system, such as a telepresence system.

In an existing conference system, a scene in a video conference is fixed, interaction efficiency is relatively low, and user experience is relatively poor.

SUMMARY

Embodiments of the present disclosure provide a method, synthesizing device, and system for implementing a video conference, which can improve interaction efficiency and user experience of the video conference.

According to a first aspect, a method for implementing a video conference is provided, including obtaining in real time an image of a first scene from a main camera located in a first conference site, obtaining in real time an image of a second scene from an auxiliary camera located in the first conference site, where the second scene is a part of the first scene, and the second scene includes a target object, generating a target image in real time according to the image of the first scene and the image of the second scene and based on a location of the target object in the first conference site, where a location of the image of the second scene in the target image is corresponding to the location of the target object in the first conference site, and sending the target image in real time to a display device located in a second conference site such that the display device plays the target image.

With reference to the first aspect, in a first implementation manner of the first aspect, generating a target image in real time according to the image of the first scene and the image of the second scene includes generating the target image in real time according to a foreground component of the image of the first scene, the image of the second scene, and a predefined background image, where the predefined background image includes a presentation file and/or a predefined image.

With reference to the first aspect and the foregoing implementation manner, in a second implementation manner of the first aspect, the auxiliary camera is movable, and the method further includes determining, according to an initial location of the auxiliary camera and motion displacement of the auxiliary camera in the first conference site, a location of the auxiliary camera when the auxiliary camera is stable in the first conference site, and determining, based on the location of the auxiliary camera when the auxiliary camera is stable in the first conference site, the location of the target object in the first conference site.

With reference to the first aspect and the foregoing implementation manner, in a third implementation manner of the first aspect, the method further includes identifying, based on a skeleton identification technology, an upper limb of a person who presents the target object in the first conference site, and determining the location of the target object in the first conference site according to a location of the upper limb in the first conference site.

With reference to the first aspect and the foregoing implementation manner, in a fourth implementation manner of the first aspect, the method further includes determining the location of the target object in the first conference site based on a location of the auxiliary camera in the image of the first scene.

According to a second aspect, a synthesizing device for implementing a video conference is provided, including a first obtaining unit configured to obtain in real time an image of a first scene from a main camera located in a first conference site, a second obtaining unit configured to obtain in real time an image of a second scene from an auxiliary camera located in the first conference site, where the second scene is a part of the first scene, and the second scene includes a target object, a synthesizing unit configured to generate a target image in real time according to the image of the first scene and the image of the second scene and based on a location of the target object in the first conference site, where a location of the image of the second scene in the target image is corresponding to the location of the target object in the first conference site, and a sending unit configured to send the target image in real time to a display device located in a second conference site such that the display device plays the target image.

With reference to the second aspect, in a first implementation manner of the second aspect, the synthesizing unit is further configured to generate the target image in real time according to a foreground component of the image of the first scene, the image of the second scene, and a predefined background image, where the predefined background image includes a presentation file and/or a predefined image.

With reference to the second aspect and the foregoing implementation manner, in a second implementation manner of the second aspect, the auxiliary camera is movable, and the synthesizing unit is further configured to determine, according to an initial location of the auxiliary camera and motion displacement of the auxiliary camera in the first conference site, a location of the auxiliary camera when the auxiliary camera is stable in the first conference site, and determine, based on the location of the auxiliary camera when the auxiliary camera is stable in the first conference site, the location of the target object in the first conference site.

With reference to the second aspect and the foregoing implementation manner, in a third implementation manner of the second aspect, the synthesizing unit is further configured to identify, based on a skeleton identification technology, an upper limb of a person who presents the target object in the first conference site, and determine the location of the target object in the first conference site according to a location of the upper limb in the first conference site.

With reference to the second aspect and the foregoing implementation manner, in a fourth implementation manner of the second aspect, the synthesizing unit is further configured to determine the location of the target object in the first conference site based on a location of the auxiliary camera in the image of the first scene.

According to a third aspect, a system for implementing a video conference is provided, including a main camera, an auxiliary camera, a synthesizing device, and a display device, where the main camera is configured to obtain in real time an image of a first scene in a first conference site, the auxiliary camera is configured to obtain in real time an image of a second scene in the first conference site, where the second scene is a part of the first scene, and the second scene includes a target object, the synthesizing device is configured to obtain the image of the first scene and the image of the second scene, and generate a target image in real time according to the image of the first scene and the image of the second scene and based on a location of the target object in the first conference site, where a location of the image of the second scene in the target image is corresponding to the location of the target object in the first conference site, and the display device is configured to obtain and play the target image in real time.

With reference to the third aspect, in a first implementation manner of the third aspect, the synthesizing device is further configured to generate the target image in real time according to a foreground component of the image of the first scene, the image of the second scene, and a predefined background image, where the predefined background image includes a presentation file and/or a predefined image.

With reference to the third aspect and the foregoing implementation manner, in a second implementation manner of the third aspect, the auxiliary camera is movable, and the synthesizing device is further configured to determine, according to an initial location of the auxiliary camera and motion displacement of the auxiliary camera in the first conference site, a location of the auxiliary camera when the auxiliary camera is stable in the first conference site, and determine, based on the location of the auxiliary camera when the auxiliary camera is stable in the first conference site, the location of the target object in the first conference site.

With reference to the third aspect and the foregoing implementation manner, in a third implementation manner of the third aspect, the synthesizing device is further configured to identify, based on a skeleton identification technology, an upper limb of a person who presents the target object in the first conference site, and determine the location of the target object in the first conference site according to a location of the upper limb in the first conference site.

With reference to the third aspect and the foregoing implementation manner, in a fourth implementation manner of the third aspect, the synthesizing device is further configured to determine the location of the target object in the first conference site based on a location of the auxiliary camera in the image of the first scene.

Based on the foregoing technical solutions, in the embodiments of the present disclosure, a participant of a video conference may freely present a local detail of an object to a counterpart, which improves interaction efficiency and user experience of the video conference. In addition, a conference scene and a locally enlarged detail of the object are presented in a same display device without requiring an extra display device, thereby reducing costs.

BRIEF DESCRIPTION OF DRAWINGS

To describe the technical solutions in the embodiments of the present disclosure more clearly, the following briefly describes the accompanying drawings required for describing the embodiments of the present disclosure. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are a part rather than all of the embodiments of the present disclosure. All other embodiments obtained by a person of ordinary skill in the art based on the embodiments of the present disclosure without creative efforts shall fall within the protection scope of the present disclosure.

Figure 1:
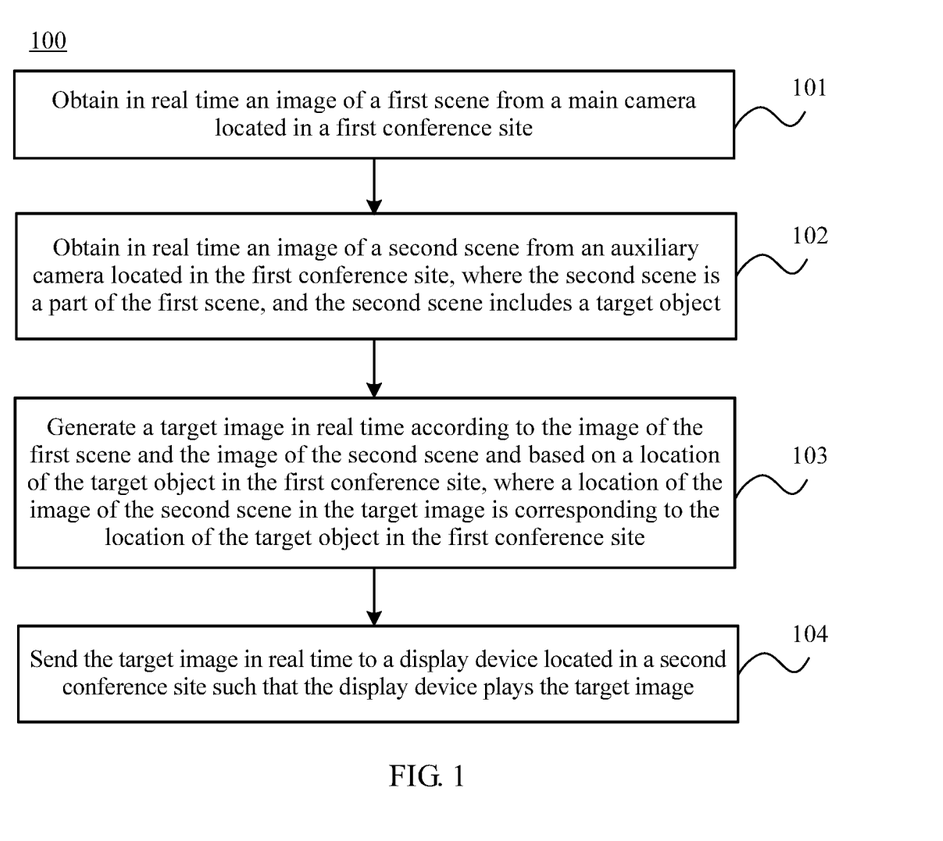
FIG. 1 is a schematic flowchart of a method for implementing a video conference according to an embodiment of the present disclosure.

FIG. 1 is a schematic flowchart of a method for implementing a video conference according to an embodiment of the present disclosure. A method 100 in FIG. 1 may be executed by a synthesizing device for implementing a video conference. Furthermore, the synthesizing device may be disposed in a first conference site or a second conference site, or the synthesizing device may be integrated on a third-party server.

Step 101: Obtain in real time an image of a first scene from a main camera located in the first conference site.

For example, a user may freely define the first scene of the first conference site when holding a video conference. Generally, the first scene is corresponding to a panorama of the first conference site that the user wants to present to a counterpart in the video conference. Consecutive images obtained in real time from the main camera may also be referred to as a video stream of the panorama of the first conference site. The main camera may be fixed at a location after the first scene is determined.

Step 102: Obtain in real time an image of a second scene from an auxiliary camera located in the first conference site, where the second scene is a part of the first scene, and the second scene includes a target object.

For example, a participant may present a detail of an object to a counterpart using the auxiliary camera when holding a video conference. Furthermore, a zoom camera or a movable auxiliary camera may be disposed in the first conference site. The auxiliary camera is configured to obtain the image of the second scene, that is, to obtain an enlarged image of a local detail of the target object. Here, a scene obtained by the auxiliary camera is defined as the second scene. Therefore, a presenter may present a detail of an object from each angle according to a need. Consecutive images obtained in real time from the auxiliary camera may also be referred to as a video stream of local enlargement of the first conference site.

Step 103: Generate a target image in real time according to the image of the first scene and the image of the second scene and based on a location of the target object in the first conference site, where a location of the image of the second scene in the target image is corresponding to the location of the target object in the first conference site.

For example, an image of the first scene photographed by the main camera is used as a reference two-dimensional plane, and a location of the target object in the reference two-dimensional plane is used as the location of the target object in the first conference site. Then, the location of the target object in the reference two-dimensional plane is determined. Finally, based on the location of the target object in the first conference site, superimposition processing is performed on the panorama image and the image of the second scene that are collected respectively by the main camera and the auxiliary camera at a same moment such that the enlarged image of a local detail of the target object can be seen in the target image.

Step 104: Send the target image in real time to a display device located in the second conference site such that the display device plays the target image.

For example, the generated target image is transmitted to the display device in the second conference site using a network, where consecutive target images form a target video stream. Therefore, a participant in the second conference site may see, using the display device, a conference scene in the first conference site and a detail of an object presented by a peer participant.

Based on the foregoing technical solution, in this embodiment of the present disclosure, a participant of a video conference may freely present a local detail of an object to a counterpart, which improves interaction efficiency and user experience of the video conference. In addition, a conference scene and a locally enlarged detail of the object are presented in a same display device without requiring an extra display device, thereby reducing costs.

In addition, the method in this embodiment of the present disclosure may be applied in a conference system in which one party acts as a speaker, or a conference system in which multiple participants equally interact with each other in the conference system. Therefore, the method has a broad application range.

It should be understood that a second scene is a part of a first scene means that the second scene is located in the first scene from a perspective of a geographical location. In other words, a relationship between the first scene and the second scene is a relationship between the whole and the part, but an angle from which an auxiliary camera obtains an image of the second scene and an angle from which a main camera obtains an image of the first scene do not need to be the same.

It should also be understood that a location of the image of the second scene in a target image is corresponding to a location of a presented object in the first conference site means that the location of the image of the second scene in the target image is the same as or similar to the location of the presented object in the first conference site, or there is a correspondence predefined by a user between the two locations. For example, the image of the second scene may be generated in a similar location in the target image such that it may be avoided that the image of the second scene shields a location of the target object in the target image if a visual effect of opaque superimposition is formed by the image of the second scene in the target image, and in addition, an effect of follow-up display can be presented.

It should also be understood that different image processing technologies may be adopted such that different visual effects of the image of the second scene in the target image are presented when the target image is generated according to the image of the first scene and the image of the second scene, for example, a transparent superimposition effect, or an opaque superimposition effect.

Optionally, in an embodiment, the target image may be generated in real time according to a foreground component of the image of the first scene, the image of the second scene, and a predefined background image when the target image is generated in real time according to the image of the first scene and the image of the second scene, where the predefined background image includes a presentation file and/or a predefined image.

For example, the foreground component (such as a participant or a desk in the first conference site) is first extracted from the image of the first scene. Then, the predefined background image is used as a background of the target image, where the target image is generated according to the foreground component of the image of the first scene, the image of the second scene, and the predefined background image.

Optionally, in another embodiment, the auxiliary camera is movable, and in this case, a location of the auxiliary camera may be determined according to an initial location of the auxiliary camera and motion displacement of the auxiliary camera in the first conference site when the auxiliary camera is stable in the first conference site. Then, the location of the target object in the first conference site is determined based on the location of the auxiliary camera when the auxiliary camera is stable in the first conference site.

For example, the image of the first scene photographed by the main camera is used as a reference two-dimensional plane, and a location of the target object in the reference two-dimensional plane is used as the location of the target object in the first conference site. Then, the location of the target object in the reference two-dimensional plane is determined. In the first conference site, the auxiliary camera is configured to obtain an image of a second scene in which the target object is located. Therefore, the location of the movable auxiliary camera may be used to identify the location of the target object, and then the location of the target object in the first conference site is determined according to the location of the auxiliary camera.

The initial location of the auxiliary camera (corresponding to a point in the reference two-dimensional plane) is predefined, and the auxiliary camera moves from the initial location to a location nearby the target object when the auxiliary camera collects the image of the second scene. In this process, a 3-axis acceleration sensor is used to obtain information such as a speed and an acceleration of the auxiliary camera in a movement process, and displacement of the auxiliary camera in the reference two-dimensional plane is determined according to the information. Then, location information of the auxiliary camera is determined according to the displacement and the initial location. Furthermore, the location at which the auxiliary camera is stable may be a location at which the auxiliary camera remains in a stopped state for a period of time.

Optionally, in another embodiment, an upper limb of a person who presents the target object in the first conference site may be identified based on a skeleton identification technology. Then, the location of the target object in the first conference site is determined according to a location of the upper limb in the first conference site.

For example, skeleton identification may be performed on a participant using a motion sensing device, thereby determining a location of an upper limb of a presenter, and further determining the location of the target object presented by the presenter. In this case, a type of a camera is not limited, for example, to a movable camera or a zoom camera. Here, the upper limb of the presenter may be a left wrist, a right wrist, or another related limb predefined by a user.

Optionally, in another embodiment, the location of the target object in the first conference site may be determined based on a location of the auxiliary camera in the image of the first scene.

For example, in the first conference site, the auxiliary camera is configured to obtain an image of a second scene in which the target object is located. Therefore, the location of the movable auxiliary camera may be used to identify the location of the target object, and then the location of the target object in the first conference site is determined according to the location of the auxiliary camera. In this case, the location of the auxiliary camera in the image of the first scene may be further determined based on an image identification technology, and then the location of the target object in the first conference site may be determined.

The following gives a detailed description of the embodiments of the present disclosure with reference to specific examples. It should be noted that these examples are merely intended to help a person skilled in the art better understand the embodiments of the present disclosure, but are not intended to limit the scope of the embodiments of the present disclosure.

Figure 2:
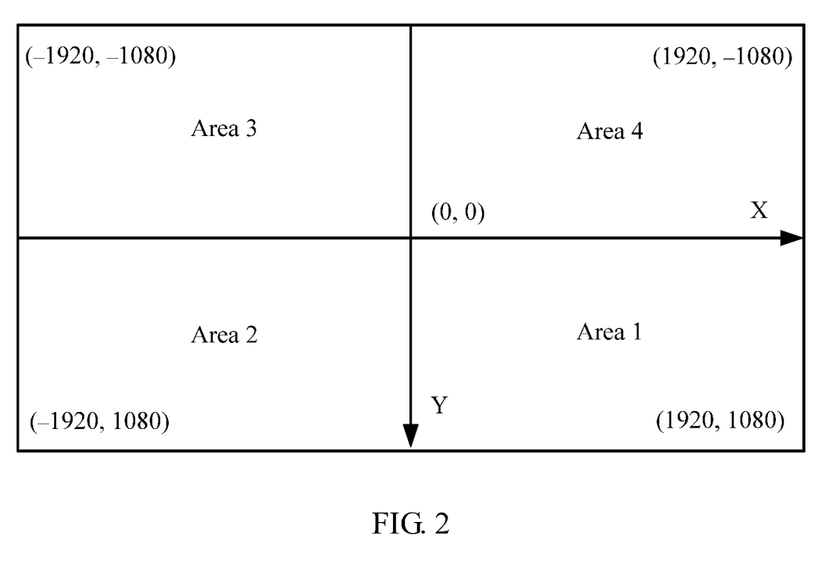
FIG. 2 is a schematic diagram of area division of a reference two-dimensional plane according to an embodiment of the present disclosure.

FIG. 2 is a schematic diagram of area division of a reference two-dimensional plane according to an embodiment of the present disclosure. When a target image is generated in real time according to an image of a first scene and an image of a second scene, and based on a location of a target object in a first conference site, processing may be performed using the following method.

An image photographed by a main camera is used as a reference two-dimensional plane. As shown in FIG. 2, it is assumed that a size of an image of the first scene collected by the main camera is 3840×2160 pixels, the reference two-dimensional plane is divided into four areas: an area 1, an area 2, an area 3, and an area 4.

The image of the second scene may be superimposed on the image of the first scene when the target image is generated according to the image of the first scene and the image of the second scene. It is assumed that coordinates of the target object in the reference two-dimensional plane are (x, y), a location of superimposition may be determined according to the following method. An initial location of a corresponding superimposition algorithm may be (x, y−1080) when the target object (x, y) is located in the area 1 or the area 2, an initial location of a corresponding superimposition algorithm may be (0, y) when the target object (x, y) is located in the area 3, or an initial location of a corresponding superimposition algorithm may be (−1920+ x, y) when the target object (x, y) is located in the area 4.

It should be understood that a user may define another initial location algorithm according to a precision need, and these derivative embodiments shall fall within the protection scope of the embodiments of the present disclosure.

Similarly, the image photographed by the main camera is used as the reference two-dimensional plane when the target image is generated according to a foreground component of the image of the first scene, the image of the second scene, and a predefined background image. In this case, the background image is used as a background of the target image, and then the foreground component of the image of the first scene and the image of the second scene are separately superimposed on the background image to form the target image. A location in which the foreground component is superimposed on the background image is the same as a location of the foreground component in the image of the first scene. Reference may be made to the above-described method when the image of the second scene is superimposed on the background image. To avoid repetition, details are not described herein.

In this way, it may be avoided that the image of the second scene shields a location of the target object in the target image, and in addition, an effect of follow-up display can be presented.

Figure 3:
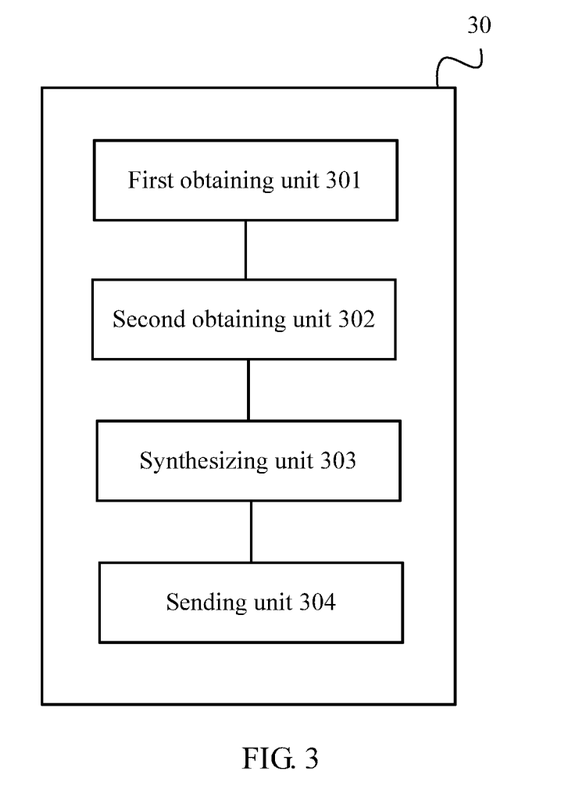
FIG. 3 is a schematic structural diagram of a synthesizing device for implementing a video conference according to an embodiment of the present disclosure.

FIG. 3 is a schematic structural diagram of a synthesizing device for implementing a video conference according to an embodiment of the present disclosure. A synthesizing device 30 in FIG. 3 includes a first obtaining unit 301, a second obtaining unit 302, a synthesizing unit 303, and a sending unit 304. The synthesizing device 30 may be disposed in a first conference site or a second conference site, or the synthesizing device 30 may be integrated on a third-party server.

The first obtaining unit 301 is configured to obtain in real time an image of a first scene from a main camera located in a first conference site.

For example, a user may freely define the first scene of the first conference site when holding a video conference. Generally, the first scene is corresponding to a panorama of the first conference site that the user wants to present to a counterpart in the video conference. Consecutive images of the first scene obtained in real time from the main camera may also be referred to as a video stream of the panorama of the first scene. The main camera may be fixed at a location after the first scene is determined.

The second obtaining unit 302 is configured to obtain in real time an image of a second scene from an auxiliary camera located in the first conference site, where the second scene is a part of the first scene, and the second scene includes a target object.

For example, a participant may present a detail of an object to a counterpart using the auxiliary camera when holding a video conference. Furthermore, a zoom camera or a movable auxiliary camera may be disposed in the first conference site, where the auxiliary camera is configured to obtain the image of the second scene, that is, to obtain an enlarged image of a local detail of the target object. Here, a scene obtained by the auxiliary camera is defined as the second scene. Therefore, a presenter may present a detail of an object from each angle according to a need. Consecutive images of the second scene obtained in real time from the auxiliary camera may also be referred to as a video stream of local enlargement of the first conference site.

The synthesizing unit 303 is configured to generate a target image in real time according to the image of the first scene and the image of the second scene and based on a location of the target object in the first conference site, where a location of the image of the second scene in the target image is corresponding to the location of the target object in the first conference site.

For example, an image of the first scene photographed by the main camera is used as a reference two-dimensional plane, and a location of the target object in the reference two-dimensional plane is used as the location of the target object in the first conference site. Then, the location of the target object in the reference two-dimensional plane is determined. Finally, based on the location of the target object in the first conference site, superimposition processing is performed on the panorama image and the image of the second scene that are collected respectively by the main camera and the auxiliary camera at a same moment such that the enlarged image of a local detail of the target object can be seen in the target image.

The sending unit 304 is configured to send the target image in real time to a display device located in a second conference site such that the display device plays the target image.

For example, the generated target image is transmitted to the display device in the second conference site using a network, where consecutive target images form a target video stream. Therefore, a participant in the second conference site may see, using the display device, a conference scene in the first conference site and a detail of an object presented by a peer participant.

Based on the foregoing technical solution, in this embodiment of the present disclosure, a participant of a video conference may freely present a local detail of an object to a counterpart, which improves interaction efficiency and user experience of the video conference. In addition, a conference scene and a locally enlarged detail of the object are presented in a same display device without requiring an extra display device, thereby reducing costs.

In addition, this embodiment of the present disclosure may be applied in a conference system in which one party acts as a speaker, or a conference system in which multiple participants equally interact with each other in the conference system. Therefore, the method has a broad application range.

It should be understood that a second scene is a part of a first scene means that the second scene is located in the first scene from a perspective of a geographical location. In other words, a relationship between the first scene and the second scene is a relationship between the whole and the part, but an angle from which an auxiliary camera obtains an image of the second scene and an angle from which a main camera obtains an image of the first scene do not need to be the same.

It should also be understood that a location of the image of the second scene in a target image is corresponding to a location of a presented object in the first conference site means that the location of the image of the second scene in the target image is the same as or similar to the location of the presented object in the first conference site, or there is a correspondence predefined by a user between the two locations. For example, the image of the second scene may be generated in a similar location in the target image such that it may be avoided that the image of the second scene shields a location of the target object in the target image if a visual effect of opaque superimposition is formed by the image of the second scene in the target image, and in addition, an effect of follow-up display can be presented.

It should also be understood that different image processing technologies may be adopted such that different visual effects of the image of the second scene in the target image are presented when the target image is generated according to the image of the first scene and the image of the second scene, for example, a transparent superimposition effect, or an opaque superimposition effect.

Optionally, in an embodiment, the synthesizing unit 303 is further configured to generate the target image in real time according to a foreground component of the image of the first scene, the image of the second scene, and a predefined background image, where the predefined background image includes a presentation file and/or a predefined image.

For example, the foreground component (such as a participant or a desk in the first conference site) is first extracted from the image of the first scene. Then, the predefined background image is used as a background of the target image, where the target image is generated according to the foreground component of the image of the first scene, the image of the second scene, and the predefined background image.

Optionally, in another embodiment, the auxiliary camera is movable, and in this case, the synthesizing unit 303 is further configured to determine, according to an initial location of the auxiliary camera and motion displacement of the auxiliary camera in the first conference site, a location of the auxiliary camera when the auxiliary camera is stable in the first conference site, and determine, based on the location of the auxiliary camera when the auxiliary camera is stable in the first conference site, the location of the target object in the first conference site.

For example, the image of the first scene photographed by the main camera is used as a reference two-dimensional plane, and a location of the target object in the reference two-dimensional plane is used as the location of the target object in the first conference site. Then, the location of the target object in the reference two-dimensional plane is determined. In the first conference site, the auxiliary camera is configured to obtain an image of a second scene in which the target object is located. Therefore, the location of the movable auxiliary camera may be used to identify the location of the target object, and then the location of the target object in the first conference site is determined according to the location of the auxiliary camera.

The initial location of the auxiliary camera (corresponding to a point in the reference two-dimensional plane) is predefined, and the auxiliary camera moves from the initial location to a location nearby the target object when the auxiliary camera collects the image of the second scene. In this process, a 3-axis acceleration sensor is used to obtain information such as a speed and an acceleration of the auxiliary camera in a movement process, and displacement of the auxiliary camera in the reference two-dimensional plane is determined according to the information. Then, location information of the auxiliary camera is determined according to the displacement and the initial location. Furthermore, the location at which the auxiliary camera is stable may be a location at which the auxiliary camera remains in a stopped state for a period of time.

Optionally, in another embodiment, the synthesizing unit 303 is further configured to identify, based on a skeleton identification technology, an upper limb of a person who presents the target object in the first conference site, and determine the location of the target object in the first conference site according to a location of the upper limb in the first conference site.

For example, skeleton identification may be performed on a participant using a motion sensing device, thereby determining a location of an upper limb of a presenter, and further determining the location of the target object presented by the presenter. In this case, a type of a camera is not limited, for example, to a movable camera or a zoom camera. Here, the upper limb of the presenter may be a left wrist, a right wrist, or another related limb predefined by a user.

Optionally, in another embodiment, the synthesizing unit 303 is further configured to determine the location of the target object in the first conference site based on a location of the auxiliary camera in the image of the first scene.

For example, in the first conference site, the auxiliary camera is configured to obtain an image of a second scene in which the target object is located. Therefore, the location of the movable auxiliary camera may be used to identify the location of the target object, and then the location of the target object in the first conference site is determined according to the location of the auxiliary camera. In this case, the location of the auxiliary camera in the image of the first scene may be further determined based on an image identification technology, and then the location of the target object in the first conference site may be determined.

Figure 4:
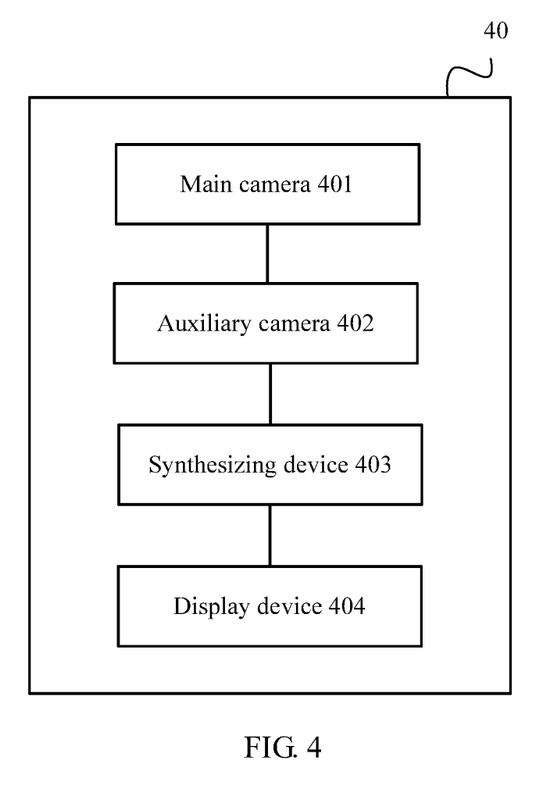
FIG. 4 is a schematic structural diagram of a system for implementing a video conference according to an embodiment of the present disclosure.

FIG. 4 is a schematic structural diagram of a system 40 for implementing a video conference according to an embodiment of the present disclosure. The system 40 includes a main camera 401, an auxiliary camera 402, a synthesizing device 403, and a display device 404.

The main camera 401 is configured to obtain in real time an image of a first scene in a first conference site.

For example, a user may freely define the first scene of the first conference site when holding a video conference. Generally, the first scene is corresponding to a panorama of the first conference site that the user wants to present to a counterpart in the video conference. Consecutive images of the first scene obtained in real time from the main camera 401 may also be referred to as a video stream of the panorama of the first conference site. The main camera 401 may be fixed at a location after the first scene is determined.

The auxiliary camera 402 is configured to obtain in real time an image of a second scene in the first conference site, where the second scene is a part of the first scene, and the second scene includes a target object.

For example, a participant may present a detail of an object to a counterpart using the auxiliary camera 402 when holding a video conference. Furthermore, a zoom camera or a movable auxiliary camera may be disposed in the first conference site, where the auxiliary camera 402 is configured to obtain the image of the second scene, that is, to obtain an enlarged image of a local detail of the target object. Here, a scene obtained by the auxiliary camera 402 is defined as the second scene. Therefore, a presenter may present a detail of an object from each angle according to a need. Consecutive images of the second scene obtained in real time from the auxiliary camera 402 may also be referred to as a video stream of local enlargement of the first conference site.

The synthesizing device 403 is configured to obtain the image of the first scene and the image of the second scene, and generate a target image in real time according to the image of the first scene and the image of the second scene and based on a location of the target object in the first conference site, where a location of the image of the second scene in the target image is corresponding to the location of the target object in the first conference site.

For example, an image of the first scene photographed by the main camera 401 is used as a reference two-dimensional plane, and a location of the target object in the reference two-dimensional plane is used as the location of the target object in the first conference site. Then, the location of the target object in the reference two-dimensional plane is determined. Finally, based on the location of the target object in the first conference site, superimposition processing is performed on the panorama image and the image of the second scene that are collected respectively by the main camera 401 and the auxiliary camera 402 at a same moment such that the enlarged image of a local detail of the target object can be seen in the target image.

The display device 404 is configured to obtain and play the target image in real time.

For example, the generated target image is transmitted to the display device in the second conference site using a network, where consecutive target images form a target video stream. Therefore, a participant in the second conference site may see, using the display device 404, a conference scene in the first conference site and a detail of an object presented by a peer participant.

Based on the foregoing technical solution, in this embodiment of the present disclosure, a participant of a video conference may freely present a local detail of an object to a counterpart, which improves interaction efficiency and user experience of the video conference. In addition, a conference scene and a locally enlarged detail of the object are presented in a same display device without requiring an extra display device, thereby reducing costs.

In addition, the method in this embodiment of the present disclosure may be applied in a conference system in which one party acts as a speaker, or a conference system in which multiple participants equally interact with each other in the conference system. Therefore, the method has a broad application range.

Furthermore, the system 40 includes a main camera 401, an auxiliary camera 402, a synthesizing device 403, and a display device 404 when applied in the conference system in which one party acts as a speaker. The main camera 401 and the auxiliary camera 402 are disposed in the first conference site (a conference site corresponding to the speaker), the display device 404 is disposed in the second conference site (another conference site in a video conference), the synthesizing device 403 may be disposed in the first conference site or the second conference site, or the synthesizing device 403 may be integrated on a third-party server.

Alternatively, two conference sites (the first conference site and the second conference site) of the system both include a main camera, an auxiliary camera, and a display device when applied in the conference system in which multiple participants equally interact with each other in the conference system, where the display device is configured to display a target video stream (formed by consecutive target images) sent from a peer conference site, the synthesizing device may be disposed in the first conference site or the second conference site, or the synthesizing device may be integrated on a third-party server.

It should be understood that a second scene is a part of a first scene means that the second scene is located in the first scene from a perspective of a geographical location. In other words, a relationship between the first scene and the second scene is a relationship between the whole and the part, but an angle from which an auxiliary camera obtains an image of the second scene and an angle from which a main camera obtains an image of the first scene do not need to be the same.

It should also be understood that a location of the image of the second scene in a target image is corresponding to a location of a presented object in the first conference site means that the location of the image of the second scene in the target image is the same as or similar to the location of the presented object in the first conference site, or there is a correspondence predefined by a user between the two locations. For example, the image of the second scene may be generated in a similar location in the target image such that it may be avoided that the image of the second scene shields a location of the target object in the target image if a visual effect of opaque superimposition is formed by the image of the second scene in the target image, and in addition, an effect of follow-up display can be presented.

It should also be understood that different image processing technologies may be adopted such that different visual effects of the image of the second scene in the target image are presented when the target image is generated according to the image of the first scene and the image of the second scene, for example, a transparent superimposition effect, or an opaque superimposition effect.

Optionally, in an embodiment, the synthesizing device 403 is further configured to generate the target image in real time according to the image of the second scene, a foreground component of the image of the first scene, and a predefined background image, where the predefined background image includes a presentation file and/or a predefined image.

For example, the foreground component (such as a participant or a desk in the first conference site) is first extracted from the image of the first scene. Then, the predefined background image is used as a background of the target image, where the target image is generated according to the foreground component of the image of the first scene, the image of the second scene, and the predefined background image.

Optionally, in another embodiment, the synthesizing device 403 is further configured to determine, according to an initial location of the auxiliary camera 402 and motion displacement of the auxiliary camera 402 in the first conference site, a location of the auxiliary camera 402 when the auxiliary camera 402 is stable in the first conference site, and determine, based on the location of the auxiliary camera 402 when the auxiliary camera 402 is stable in the first conference site, the location of the target object in the first conference site.

For example, the image of the first scene photographed by the main camera 401 is used as a reference two-dimensional plane, and a location of the target object in the reference two-dimensional plane is used as the location of the target object in the first conference site. Then, the location of the target object in the reference two-dimensional plane is determined. In the first conference site, the auxiliary camera 402 is configured to obtain an image of a second scene in which the target object is located. Therefore, the location of the movable auxiliary camera may be used to identify the location of the target object, and then the location of the target object in the first conference site is determined according to the location of the auxiliary camera 402.

The initial location of the auxiliary camera 402 (corresponding to a point in the reference two-dimensional plane) is predefined, and the auxiliary camera 402 moves from the initial location to a location nearby the target object when the auxiliary camera 402 collects the image of the second scene. In this process, a 3-axis acceleration sensor is used to obtain information such as a speed and an acceleration of the auxiliary camera 402 in a movement process, and displacement of the auxiliary camera 402 in the reference two-dimensional plane is determined according to the information. Then, location information of the auxiliary camera 402 is determined according to the displacement and the initial location. Further, the location at which the auxiliary camera 402 is stable may be a location at which the auxiliary camera 402 remains in a stopped state for a period of time.

Optionally, in another embodiment, the synthesizing device 403 is further configured to identify, based on a skeleton identification technology, an upper limb of a person who presents the target object in the first conference site, and determine the location of the target object in the first conference site according to a location of the upper limb in the first conference site.

For example, skeleton identification may be performed on a participant using a motion sensing device, thereby determining a location of an upper limb of a presenter, and further determining the location of the target object presented by the presenter. In this case, a type of a camera is not limited, for example, to a movable camera or a zoom camera. Here, the upper limb of the presenter may a left wrist, a right wrist, or another related limb predefined by a user.

Optionally, in another embodiment, the synthesizing device 403 is further configured to determine the location of the target object in the first conference site based on a location of the auxiliary camera in the image of the first scene.

For example, in the first conference site, the auxiliary camera 402 is configured to obtain an image of a second scene in which the target object is located. Therefore, the location of the movable auxiliary camera may be used to identify the location of the target object, and then the location of the target object in the first conference site is determined according to the location of the auxiliary camera 402. In this case, the location of the auxiliary camera 402 in the image of the first scene may be further determined based on an image identification technology, and then the location of the target object in the first conference site may be determined.

Figure 5:
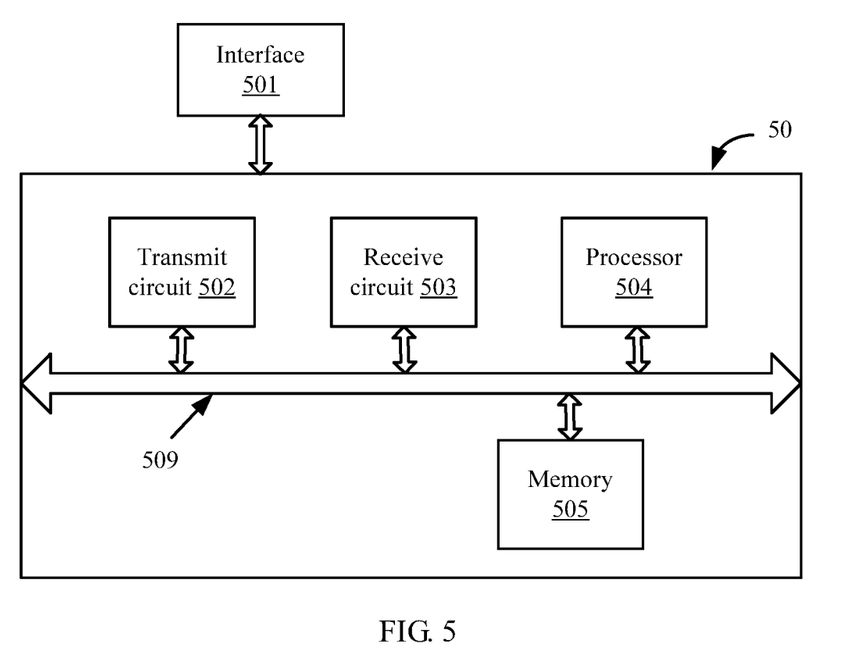
FIG. 5 is a schematic structural diagram of a synthesizing device for implementing a video conference according to another embodiment of the present disclosure.

FIG. 5 is a schematic structural diagram of a synthesizing device for implementing a video conference according to another embodiment of the present disclosure.

A synthesizing device 50 in FIG. 5 may be configured to implement steps and methods in the foregoing method embodiments. In the embodiment of FIG. 5, the synthesizing device 50 includes an interface 501, a transmit circuit 502, a receive circuit 503, a processor 504, and a memory 505. The processor 504 controls an operation of the synthesizing device 50, and may be configured to process a signal. The memory 505 may include a read-only memory (ROM) and a random access memory (RAM), and provides an instruction and data to the processor 504. The transmit circuit 502 and the receive circuit 503 may be coupled to the interface 501. All components of the synthesizing device 50 are coupled together using a bus system 509, where the bus system 509 further includes a power bus, a control bus, and a status signal bus in addition to a data bus. However, for clarity of description, various buses are marked as the bus system 509 in the FIG. 5.

Further, the memory 505 may store an instruction that executes the following process: obtaining in real time an image of a first scene from a main camera located in a first conference site, obtaining in real time an image of a second scene from an auxiliary camera located in the first conference site, where the second scene is a part of the first scene, and the second scene includes a target object, generating a target image in real time according to the image of the first scene and the image of the second scene and based on a location of the target object in the first conference site, where a location of the image of the second scene in the target image is corresponding to the location of the target object in the first conference site, and sending the target image in real time to a display device located in a second conference site such that the display device plays the target image.

Based on the foregoing technical solution, in this embodiment of the present disclosure, a participant of a video conference may freely present a local detail of an object to a counterpart, which improves interaction efficiency and user experience of the video conference. In addition, a conference scene and a locally enlarged detail of the object are presented in a same display device without requiring an extra display device, thereby reducing costs.

In addition, the method in this embodiment of the present disclosure may be applied in a conference system in which one party acts as a speaker, or a conference system in which multiple participants equally interact with each other in the conference system. Therefore, the method has a broad application range.

It should be understood that a second scene is a part of a first scene means that the second scene is located in the first scene from a perspective of a geographical location. In other words, a relationship between the first scene and the second scene is a relationship between the whole and the part, but an angle from which an auxiliary camera obtains an image of the second scene and an angle from which a main camera obtains an image of the first scene do not need to be the same.

It should also be understood that a location of the image of the second scene in a target image is corresponding to a location of a presented object in the first conference site means that the location of the image of the second scene in the target image is the same as or similar to the location of the presented object in the first conference site, or there is a correspondence predefined by a user between the two locations. For example, the image of the second scene may be generated in a similar location in the target image such that it may be avoided that the image of the second scene shields a location of the target object in the target image if a visual effect of opaque superimposition is formed by the image of the second scene in the target image, and in addition, an effect of follow-up display can be presented.

It should also be understood that different image processing technologies may be adopted such that different visual effects of the image of the second scene in the target image are presented when the target image is generated according to the image of the first scene and the image of the second scene, for example, a transparent superimposition effect, or an opaque superimposition effect.

Optionally, in an embodiment, the memory 505 may further store an instruction that executes the process of generating the target image in real time according to a foreground component of the image of the first scene, the image of the second scene, and a predefined background image when the target image is generated in real time according to the image of the first scene and the image of the second scene, where the predefined background image includes a presentation file and/or a predefined image.

Optionally, in another embodiment, the memory 505 may further store an instruction that executes the process of determining, according to an initial location of the auxiliary camera and motion displacement of the auxiliary camera in the first conference site, a location of the auxiliary camera when the auxiliary camera is stable in the first conference site, and determining the location of the target object in the first conference site based on the location of the auxiliary camera when the auxiliary camera is stable in the first conference site.

Optionally, in another embodiment, the memory 505 may further store an instruction that executes the process of identifying, based on a skeleton identification technology, a limb of a person who presents the target object in the first conference site, and determining the location of the target object in the first conference site according to a location of the limb in the first conference site.

Optionally, in another embodiment, the memory 505 may further store an instruction that executes the process of determining the location of the target object in the first conference site based on a location of the auxiliary camera in the image of the first scene.

It should be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

It should be understood that, the term "and/or" in the embodiments of the present disclosure describes only an association relationship for describing associated objects and represents that three relationships may exist. For example, A and/or B may represent the following three cases: only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present disclosure.

In addition, functional units in the embodiments of the present disclosure may be integrated into one processing unit, or each of the units may exist alone physically, or at least two units are integrated into one unit. The integrated unit may be implemented in a form of hardware, or may be implemented in a form of a software functional unit.

The integrated unit may be stored in a computer-readable storage medium when the integrated unit is implemented in the form of a software functional unit and sold or used as an independent product. Based on such an understanding, the technical solutions of the present disclosure essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present disclosure. The foregoing storage medium includes any medium that can store program code, such as a universal serial bus (USB) flash drive, a removable hard disk, a ROM, a RAM, a magnetic disk, or an optical disc.

The foregoing descriptions are merely specific embodiments of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for implementing a video conference, comprising:
   obtaining in real time a first image of a first scene from a main camera located in a first conference site;
   obtaining in real time a second image of a second scene from an auxiliary camera located in the first conference site, wherein the second scene is part of the first scene, and wherein the second scene comprises a target object;
   generating a target image in real time by superimposing the second image over the first image, wherein the target image is based on a location of the target object in the first conference site, wherein the target image contains an enlarged detail of the target object from the second image, and wherein a location of the second image in the target image corresponds to the location of the target object in the first conference site; and
   sending the target image in real time to a display device located in a second conference site for display of the target image.

2. The method according to claim 1, wherein generating the target image in real time comprises generating the target image in real time by superimposing each of a foreground component of the first image, the second image, and a predefined background image, wherein the predefined background image comprises a presentation file and a predefined image.

3. The method according to claim 1, wherein generating the target image in real time comprises generating the target image in real time by superimposing each of a foreground component of the first image, the second image, and a predefined background image, wherein the predefined background image comprises at least a presentation file.

4. The method according to claim 1, wherein generating the target image in real time comprises generating the target image in real time by superimposing each of a foreground component of the first image, the second image, and a predefined background image, wherein the predefined background image comprises a predefined image.

5. The method according to claim 1, wherein the auxiliary camera is selectively movable, and wherein the method further comprises:
   determining, according to an initial location of the auxiliary camera and motion displacement of the auxiliary camera in the first conference site, a location of the auxiliary camera when the auxiliary camera is stable in the first conference site; and
   determining, based on the location of the auxiliary camera when the auxiliary camera is stable in the first conference site, the location of the target object in the first conference site.

6. The method according to claim 1, further comprising:
   identifying, based on a skeleton identification technology, an upper limb of a person who presents the target object in the first conference site; and
   determining the location of the target object in the first conference site according to a location of the upper limb in the first conference site.

7. The method according to claim 1, further comprising determining the location of the target object in the first conference site based on a location of the auxiliary camera in the first image.

8. A synthesizing device for implementing a video conference, comprising:
   a memory comprising instructions;
   a processor coupled to the memory;
   a receiver coupled to the processor and configured to:
      obtain in real time a first image of a first scene from a main camera located in a first conference site; and
      obtain in real time a second image of a second scene from an auxiliary camera located in the first conference site, wherein the second scene is a part of the first scene, and the second scene comprises a target object;
   wherein the processor is configured to generate a target image in real time by superimposing the first image and the second image, wherein the target image is based on a location of the target object in the first conference site, wherein the target image contains an enlarged detail of the target object from the second image, and wherein a location of the second image in the target image corresponds to the location of the target object in the first conference site; and
   a transmitter coupled to the processor and configured to send the target image in real time to a display device located in a second conference site for display of the target image.

9. The synthesizing device according to claim 8, wherein the instructions further cause the processor to be configured to generate the target image in real time by superimposing each of a foreground component of the first image, the second image, and a predefined background image, wherein the predefined background image comprises a presentation file and a predefined image.

10. The synthesizing device according to claim 8, wherein the instructions further cause the processor to be configured to generate the target image in real time by superimposing each of a foreground component of the first image, the second image, and a predefined background image, wherein the predefined background image comprises a presentation file.

11. The synthesizing device according to claim 8, wherein the instructions further cause the processor to be configured to generate the target image in real time by superimposing each of a foreground component of the first image, the second image, and a predefined background image, wherein the predefined background image comprises a predefined image.

12. The synthesizing device according to claim 8, wherein the auxiliary camera is movable, and wherein the instructions further cause the processor to be configured to:
  determine, according to an initial location of the auxiliary camera and motion displacement of the auxiliary camera in the first conference site, a location of the auxiliary camera when the auxiliary camera is stable in the first conference site; and
  determine, based on the location of the auxiliary camera when the auxiliary camera is stable in the first conference site, the location of the target object in the first conference site.

13. The synthesizing device according to claim 8, wherein the instructions further cause the processor to be configured to:
  identify, based on a skeleton identification technology, an upper limb of a person who presents the target object in the first conference site; and
  determine the location of the target object in the first conference site according to a location of the upper limb in the first conference site.

14. The synthesizing device according to claim 8, wherein the instructions further cause the processor to be configured to determine the location of the target object in the first conference site based on a location of the auxiliary camera in the first image.

15. A system for implementing a video conference, comprising:
  a memory comprising instructions;
  a processor coupled to the memory;
  a main camera coupled to the processor and configured to obtain in real time a first image of a first scene in a first conference site;
  an auxiliary camera coupled to the processor and configured to obtain in real time a second image of a second scene in the first conference site, wherein the second scene is part of the first scene, and wherein the second scene comprises a target object, wherein the processor is configured to:
    obtain the first image and the second image; and
    generate a target image in real time by superimposing the second image over the first image, wherein the target image is based on a location of the target object in the first conference site, wherein the target image contains an enlarged detail of the target object from the second image, and wherein a location of the second image in the target image corresponds to the location of the target object in the first conference site, and
  a display device coupled to the processor and configured to:
    obtain the target image in real time; and
    play the target image in real time.

16. The system according to claim 15, wherein the instructions further cause the processor to be configured to generate the target image in real time by superimposing each of a foreground component of the first image, the second image, and a predefined background image, wherein the predefined background image comprises a presentation file and a predefined image.

17. The system according to claim 15, wherein the instructions further cause the processor to be configured to generate the target image in real time by superimposing each of a foreground component of the first image, the second image, and a predefined background image, wherein the predefined background image comprises a presentation file or a predefined image.

18. The system according to claim 15, wherein the auxiliary camera is movable, and wherein the instructions further cause the processor to be configured to:
  determine, according to an initial location of the auxiliary camera and motion displacement of the auxiliary camera in the first conference site, a location of the auxiliary camera when the auxiliary camera is stable in the first conference site; and
  determine, based on the location of the auxiliary camera when the auxiliary camera is stable in the first conference site, the location of the target object in the first conference site.

19. The system according to claim 15, wherein the instructions further cause the processor to be configured to:
  identify, based on a skeleton identification technology, an upper limb of a person who presents the target object in the first conference site; and
  determine the location of the target object in the first conference site according to a location of the upper limb in the first conference site.

20. The system according to claim 15, wherein the instructions further cause the processor to be configured to determine the location of the target object in the first conference site based on a location of the auxiliary camera in the first image.

* * * * *